US00RE45182E

(19) United States
(12) Reissued Patent
Nelson

(10) Patent Number: US RE45,182 E
(45) Date of Reissued Patent: Oct. 7, 2014

(54) TRAMPOLINE ENCLOSURE ATTACHMENT TO TRAMPOLINE MAT

(75) Inventor: Chris Nelson, Provo, UT (US)

(73) Assignee: Skywalker Holdings, LLC, Rancho Mirage, CA (US)

(21) Appl. No.: 13/554,700

(22) Filed: Jul. 20, 2012

Related U.S. Patent Documents

Reissue of:
(64) Patent No.: 7,758,471
Issued: Jul. 20, 2010
Appl. No.: 11/439,885
Filed: May 24, 2006

U.S. Applications:
(60) Provisional application No. 60/684,107, filed on May 24, 2005.

(51) Int. Cl.
*A63B 21/00* (2006.01)

(52) U.S. Cl.
USPC ..... 482/27; 482/28

(58) Field of Classification Search
USPC ..... 482/27, 28, 29; 5/187, 180, 182, 710; D21/240, 811; 182/149
See application file for complete search history.

(56) References Cited

U.S. PATENT DOCUMENTS

| | | | | | |
|---|---|---|---|---|---|
| 3,546,721 | A * | 12/1970 | Cleary | 5/97 |
| 4,433,838 | A * | 2/1984 | Gordon | 473/473 |
| 5,399,132 | A * | 3/1995 | Bailey | 482/29 |
| D382,618 | S * | 8/1997 | Gift | D21/814 |
| 6,053,845 | A * | 4/2000 | Publicover et al. | 482/35 |
| 6,129,649 | A * | 10/2000 | Yang | 482/27 |
| 6,261,207 | B1 * | 7/2001 | Publicover et al. | 482/27 |
| 6,607,468 | B1 * | 8/2003 | Nichols et al. | 482/27 |
| D536,405 | S * | 2/2007 | Freeman | D21/811 |
| 2002/0137598 | A1 * | 9/2002 | Publicover et al. | 482/27 |
| 2004/0121883 | A1 * | 6/2004 | Publicover | 482/29 |

* cited by examiner

*Primary Examiner* — Jerome W Donnelly
(74) *Attorney, Agent, or Firm* — Kirton McConkie; Evan R. Witt

(57) ABSTRACT

A way to attach a trampoline enclosure to a trampoline frame is described. This process involving constructing the enclosure with a buttonhole at or near its bottom edge. This buttonhole is designed to receive a spring attachment feature located on the rebounding mat of the trampoline structure. Generally, this spring attachment feature will be the D-ring (or V-ring) that is used to attach the rebounding mat to the springs. The D-ring will pass through the buttonhole and, when connected to a corresponding spring, will securely attach the trampoline enclosure to the trampoline.

20 Claims, 5 Drawing Sheets

TRAMPOLINE ENCLOSURE ATTACHMENT TO TRAMPOLINE MAT

Matter enclosed in heavy brackets [ ] appears in the original patent but forms no part of this reissue specification; matter printed in italics indicates the additions made by reissue.

CROSS-REFERENCED RELATED APPLICATIONS

This application claims the benefit of U.S. Provisional Application No. 60/684,107, filed May 24, 2005. This provisional application is expressly incorporated herein by reference.

BACKGROUND OF THE INVENTION

The present invention relates to trampoline enclosures. More specifically, the present invention relates to an apparatus and method for attaching a trampoline enclosure to a trampoline.

Trampoline enclosures are structures surrounding a trampoline used to protect jumpers from some types of accidents. Currently available trampoline enclosures may include a flexible wall or net positioned and supported by support rods spaced about the perimeter of a trampoline. A typical example of a known trampoline enclosure structure is taught in U.S. Pat. No. 6,053,845 (which patent is expressly incorporated herein by reference and will be referred to herein as the "'845 patent"). As is known in the art, the support rods extend above the trampoline to support and position the net about the perimeter of the rebounding surface of the trampoline. Currently available flexible walls are attached to the rebounding surface or trampoline mat by a rope loosely woven about the perimeter of the trampoline or trampoline mat, which is also referred to herein as a "rebounding surface".

This currently available method of attachment has several disadvantages. For example, manually weaving the flexible wall and the rebound surface together with a cord or rope is tedious and time consuming. Moreover, gaps may exist between the rebounding surface and the bottom of the flexible wall. These gaps can result in injuries as limbs slide into the gaps or between the springs throwing a jumper off balance. For smaller jumpers, they may actually slip through the gap or between the springs and fall off the trampoline. Additionally, the springs are typically made of metal and can cause injuries should a jumper fall against them.

Therefore, a need exists for an attachment method and apparatus that quickly and securely attaches the bottom of the flexible wall to the trampoline and minimizes the gaps that may be located between the flexible wall and the rebounding surface. Additionally, a need exists for an attachment apparatus that may be inexpensively manufactured and requires few parts.

BRIEF SUMMARY OF THE INVENTION

The apparatus of the present invention has been developed in response to the present state of the art, and in particular, in response to the problems and needs in the art that have not yet been fully solved by currently available trampoline enclosure attachment methods and apparatus. The present invention is drawn to an apparatus and method of attaching a trampoline enclosure to a trampoline mat. In accordance with the invention as embodied and broadly described herein in the preferred embodiment, a trampoline enclosure includes a plurality of "buttonholes" spaced around the bottom edge of the flexible wall of the trampoline enclosure. The trampoline mat includes a plurality of spring attachment features, such as D-rings (which are also called "V-rings") and the buttonholes are sized to allow passage of the spring attachment features.

The trampoline enclosure includes a plurality of support rods and a flexible wall connectable to the vertical support rods. The flexible wall may be a net or fabric made of woven fibers or plastic sheets designed to prevent jumpers from falling off of a trampoline. The fibers or sheets may be made of cotton, hemp, or other naturally occurring fibers or may be made of synthetic polymers, such as nylon or HDPE.

The flexible wall includes a plurality of buttonholes that are positioned proximate the bottom of the flexible wall. *The buttonholes may be shaped to be positioned over a plurality of spring attachment features, such as D-rings of a rebounding surface of a trampoline.* The buttonholes may be shaped to allow passage of the spring attachment features (such as D-rings of a rebounding surface of a trampoline) through the buttonholes. When attached to the trampoline mat, the flexible wall protects a jumper from impacting the springs of the trampoline or falling off of the trampoline.

The flexible wall preferably includes a reinforcement strip that supports the buttonholes and prevents them from tearing. The reinforcement strip may be another piece of fabric attached to the flexible wall proximate the bottom of the flexible wall or alternatively, may be a plurality of layers of the fabric of the flexible wall sewn together.

The buttonholes of the flexible wall may be formed and reinforced in several ways. For example, the buttonholes may include sewn edges. The sewn edges may include a buttonhole stitch which is a closely worked loop stitch used to make a firm edge of the buttonhole.

Alternatively, the buttonholes of the flexible wall may include solid plastic disposed about the edges of the buttonhole. This type of buttonhole may be made with a hot knife that cuts the flexible wall and/or reinforcement strip while simultaneously melting the woven polymeric fabric of the flexible wall and/or reinforcement strip. Alternatively, the buttonholes may be cut and if they are made of plastic, the edges of the buttonholes melted at a different time.

The buttonholes may also be reinforced by a plastic or metal eyelet. The eyelet may be attached to the flexible wall in a similar fashion to a rivet that is crimped onto fabric. Alternatively, the metal eyelet may be sewn onto the flexible wall or attached in some other method known in the art.

The flexible wall may also include a tab that defines one of the buttonholes. The tab may be a separate piece of fabric attached to the flexible wall that forms a buttonhole. Alternatively, the tab may be made integrally with the flexible wall.

*Once the buttonholes are positioned over the spring attachment features of a rebounding surface, the springs of the trampoline may be attached to the spring attachment features.* Once the spring attachment features of a rebounding surface are passed through the buttonholes, the springs of the trampoline may be attached to the spring attachment features. The springs of the trampoline prevent the buttonholes from detaching from the spring attachment features.

Passing the spring attachment features of a rebounding surface of a trampoline trough the buttonholes is a quick and effective method of attaching the trampoline enclosure to the trampoline mat. In addition, gaps between the rebounding surface and the flexible wall are minimized which helps to prevent injuries. These and other features and advantages of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the present embodiments, as represented in the Figures, is not intended to limit the scope of the invention, as claimed, but is merely representative of presently preferred embodiments of the invention.

As described in greater detail above, trampolines and trampoline systems may be designed with safety enclosures that surround the trampoline's rebounding surface. A typical example of such a trampoline and a safety enclosure is found in the '845 patent. Accordingly, the reader should review the '845 patent for a description of these types of features.

Those of skill in the art will recognize that the system shown in the '845 patent is simply one example of a trampoline and enclosure system that may be used. Other types of trampoline and enclosure systems fall within the scope of the present invention. In fact, another type of system, in which the poles that support the enclosure are attached to the trampoline frame via brackets and/or swaging is described in U.S. Provisional Patent Application No. 60/684,105 entitled "Trampoline Enclosure Attachment Receptor" (which provisional application is incorporated herein by reference).

Figure 1:
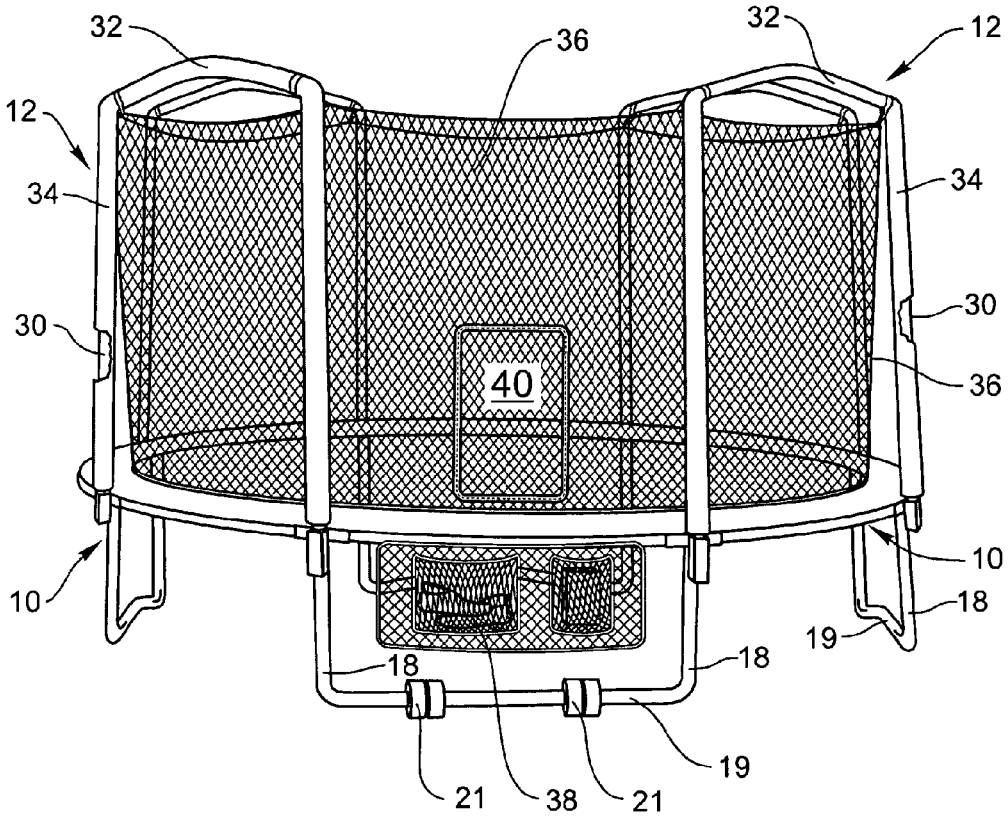
FIG. 1 is a perspective view of a trampoline enclosure attached to a trampoline.
Figure 2:
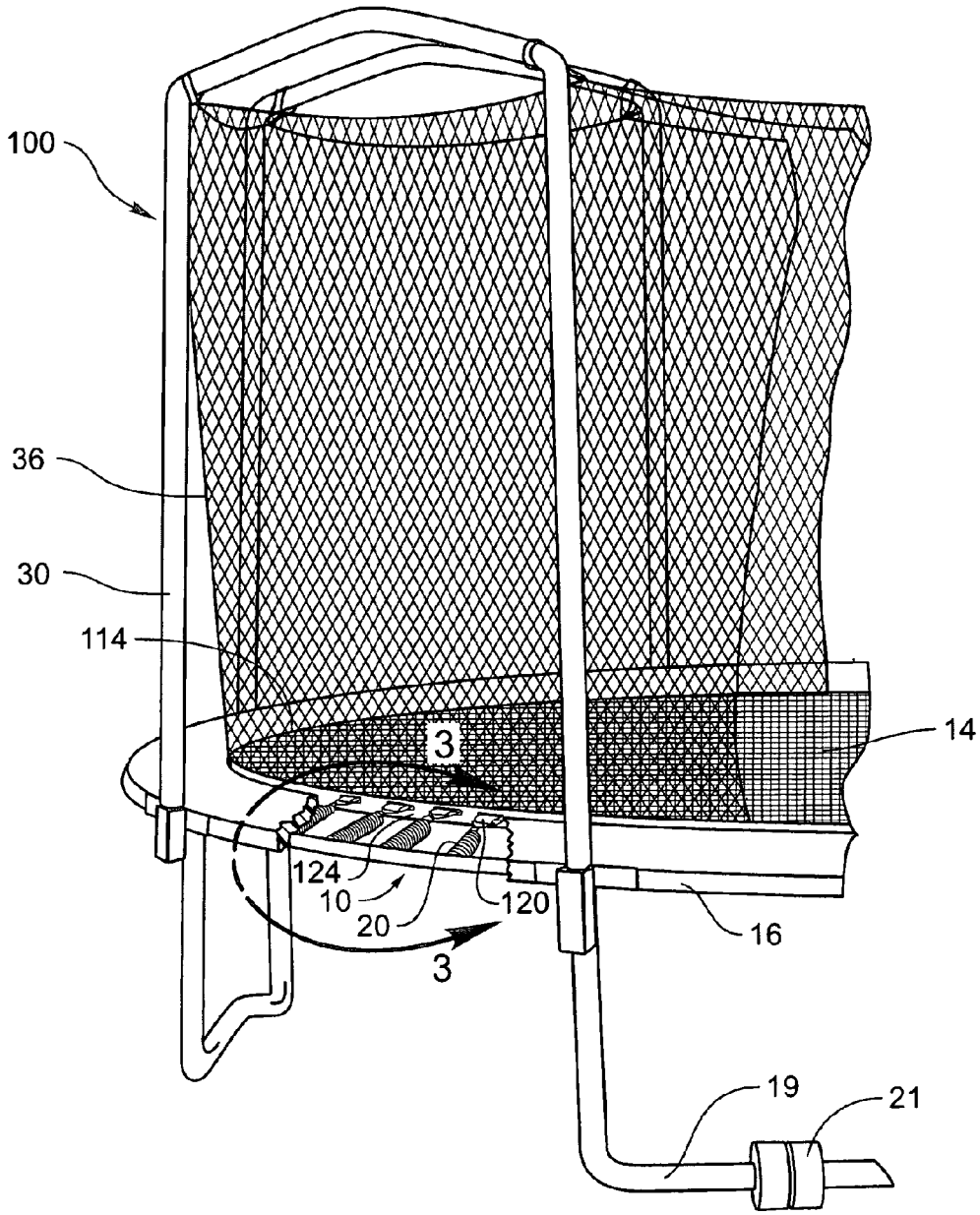
FIG. 2 is a partially cutaway perspective view of the trampoline enclosure and trampoline of FIG. 1.

Referring now to FIGS. 1 and 2, a trampoline 10 and a trampoline enclosure 12 is illustrated. The trampoline will generally include a rebounding mat 14 and a frame 16 that supports the mat 14. The frame will be elevated off the ground by a plurality of the legs 18 that attach to and support the frame 16. As is known in the art, the rebounding mat 14 will be attached to the frame via a plurality of springs 20. Generally, the springs 20 are attached to the frame 16 and the mat 14 in such a way that a user may "jump" on the mat 14. A frame pad 22 may be positioned over the springs 20 to prevent the user from accidentally being injured by jumping on the springs 20 or coming in contact with the frame.

As shown in FIGS. 1 and 2, a pair of the legs 18 may be attached to a support 19 that is positioned on the ground to support the trampoline 10. In some embodiments, one or more of the supports 19 are curved upward such that a middle portion of the support 19 is off of the ground. As desired, one or more wheels 21 may be added to one or more of the supports 19 to facilitate movement of the trampoline 10.

The trampoline enclosure 12 may be, for example, similar to conventional trampoline enclosures, including the enclosure taught in the '845 patent. The enclosure 12 may comprise a plurality of support rods 30 (sometimes called poles) that are attached to the legs 18. The poles will extend upwards from the legs 18 such that they are positioned above the rebounding mat 14. As is shown in FIGS. 1 and 2, trampoline enclosure systems may be constructed in which each of the legs 18 is connected to a separate rod 30. Thus, in the embodiment shown in FIGS. 1 and 2, eight support rods 30 are illustrated. Of course, other embodiments may also be constructed in which the number of legs 18 does not correspond to the number of support rods 30. Of course, other configurations of the trampoline 10, the support rods 30, and/or the enclosure 12 may also be used including configurations having more or fewer legs and support rods.

As shown in FIGS. 1 and 2, the support rods 30 include an attachment piece 32 that is designed to connect two adjacent support rods 30 together. In general, the attachment piece 32 will include openings that will receive the top of the rod 30, thereby forming an inverted U-shaped structure. Covering 34 may then be disposed over the top of the support rods 30 and the attachment piece 32 to provide additional padding to the user.

The enclosure 12 also comprises a flexible wall 36 (sometimes called a flexible material) that is coupled to the support rods 30. In many embodiments, this flexible wall 36 comprises netting made of polyethylene, nylon and/or other similar fabrics. The flexible wall 36 will surround the periphery of the rebounding mat 14 and will be attached to the rebounding mat 14. As is known in the art, this flexible wall 36 is designed to absorb the impact of forces, persons, etc. that collide against the enclosure 12 and prevent these individuals, etc. from falling off the rebounding mat 14. In general, the rebounding mat 14 will be coupled to the flexible material 36 through a variety of different methods, including those known methods disclosed in the '845 patent. However, other embodiments may be constructed in which the mat 14 is coupled to the flexible wall 36/enclosure 12 via the methods taught in U.S. Provisional Patent Application No. 60/684,107 (which provisional application is expressly incorporated herein by reference).

The flexible wall 36 is also connected to the support rods 30. This may occur by tying, adhesives, fasteners, threading the support rods 30 through openings in the flexible wall 36, and/or other methods of attachment known in the art. Other embodiments may have a portion of the flexible wall 36 attached to the attachment pieces 32 via ties, loops, etc. A closable opening 40 may also be added to the enclosure 12 to allow a user to access the interior of the enclosure 12 so that he or she may "jump" on the rebounding mat 14. The opening 40 may be "closed" via the use of adhesive, ties, hook and loop fasteners, and/or other mechanisms. One or more pockets 38 may also be added to hold the user's shoes, wallet, possessions, etc.

Figure 3:
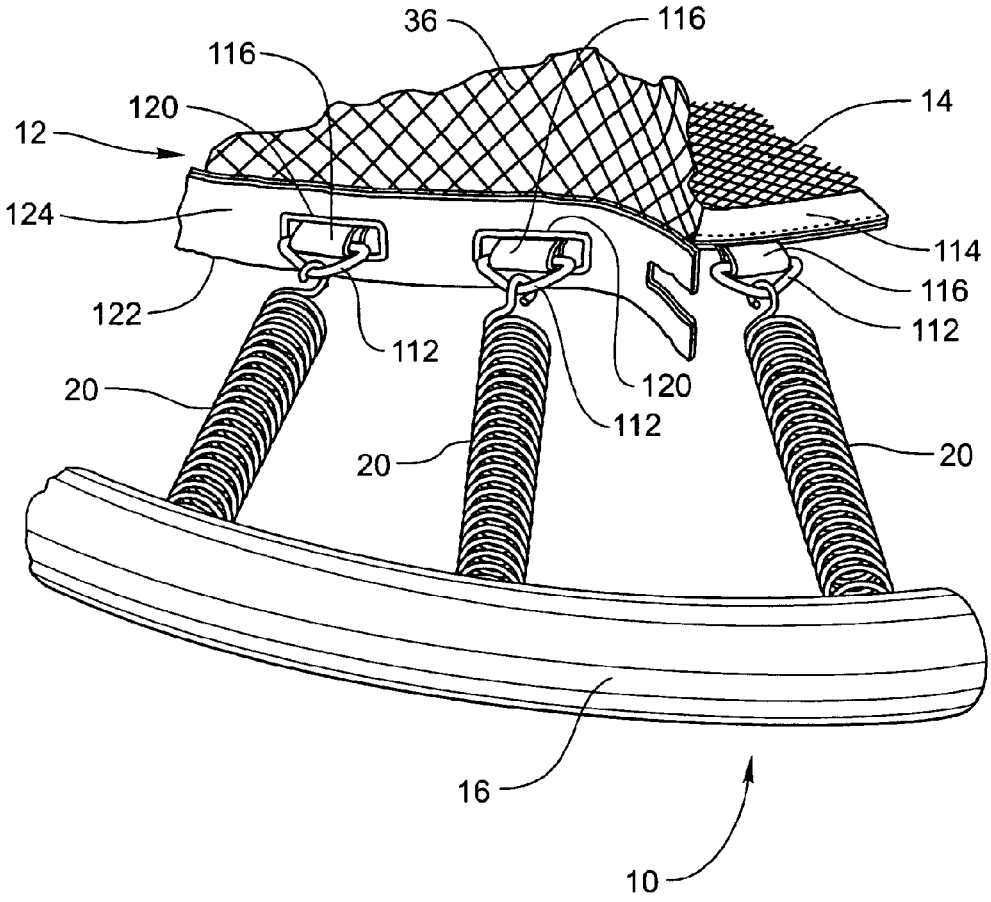
FIG. 3 is a perspective view of a buttonhole fitted over a typical spring attachment feature of a rebounding surface of a trampoline.

FIG. 3 is a perspective view of the trampoline enclosure 12 attached to the trampoline 10. The trampoline 10 includes a rebounding mat 14 having spring attachment features 112 distributed about an outer edge 114 of the rebounding mat 14 for attachment to the springs 20. The spring attachment features 112 may be a metal D-ring (sometimes called a V-ring) attached to the rebounding mat 14 by a tab 116. The springs 20 are attached to the frame 16 of the trampoline and pull the rebounding mat 14 taut.

The trampoline enclosure 12 includes a plurality of buttonholes 120 that are shaped to be fitted over the spring attachment feature 112 of a rebounding mat 14 of a trampoline 10. *The buttonholes 120 may be shaped to allow passage of the spring attachment features 112 through the buttonholes.* The buttonholes 120 are shown disposed proximate the bottom edge 122 of the flexible wall 36 and may be formed in a reinforcement strip 124 of the flexible wall 36. The buttonholes 120 provide a means for attaching the flexible wall 36 about the outer edge 114 of the rebounding mat 14. This close attachment of the flexible wall 36 to the rebounding mat 14 helps to protect a jumper from impacting against the springs 20 or slipping between the flexible wall 36 and the rebounding mat 14 and becoming entangled or falling off of the trampoline 10.

The reinforcement strip 124 helps to support the forces experienced by the buttonholes 120 during trampoline use and helps to prevent the material defining the buttonholes 120 from fraying or tearing. As shown, the reinforcement strip 124 is made of a separate piece of material that is attached proximate to the bottom edge 122 of the flexible wall 106.

As illustrated, FIG. 3 show the enclosure 12 in which only a portion of the spring attachment features 112 have been threaded through the buttonholes 120. This illustration is made for purposes of illustrating the engagement between the attachment features 112 and the buttonholes 120. When the trampoline 10/enclosure 12 are actually used, it is preferable to have all (or substantially all) of the attachment features 112 threaded through the buttonholes 120 in order to provide the greatest amount of engagement between the enclosure 12 and the trampoline 10. In fact, once the attachment feature 112 has been threaded through the buttonholes 120, the springs 20 may be added and attached to the attachment features 112 so that the rebounding mat 14 is pulled taut. In this configuration, the flexible wall 36 will be secured to the outer edge 114 of the rebounding mat 14.

Figure 4:
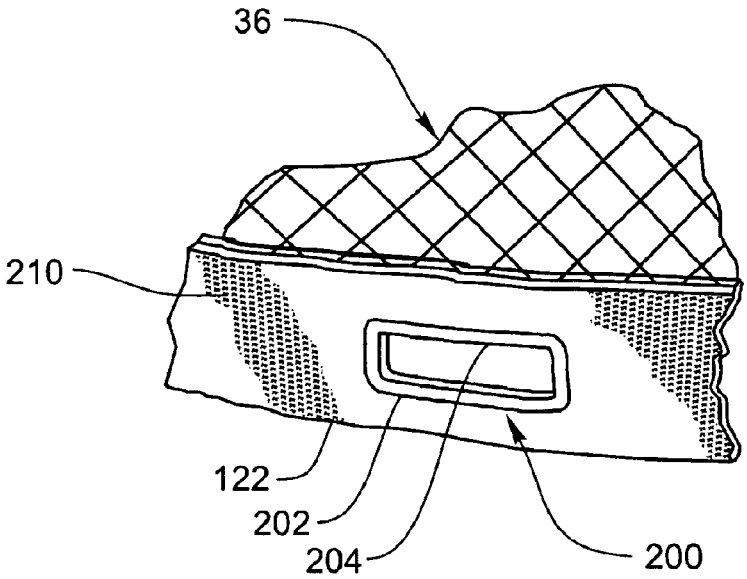
FIG. 4 is a front elevation view of another buttonhole according to the invention.

Referring now to FIG. 4, a front elevation view of another embodiment of the buttonhole 200 is illustrated. This buttonhole 200 disposed proximate the bottom edge 122 of the flexible wall 36 according to the present embodiments. The buttonhole 200 includes solid plastic 202 disposed on an edge 204 of the buttonhole 200. The solid plastic 202 may be formed by disposing melted plastic, such as nylon, on and around the edge of the button 200. Alternatively, if the flexible wall 36 is made of a plastic (such as thermoplastic, thermosetting plastics, etc.), a hot knife may be used to simultaneously cut the buttonhole 200 and melt the plastic at the edge 204 forming a solid plastic edge 202.

As shown, the buttonhole 200 may be positioned in a reinforcement strip 210. The reinforcement strip 210 may be formed by a plurality of folded layers of material of the flexible wall 36.

Figure 5:
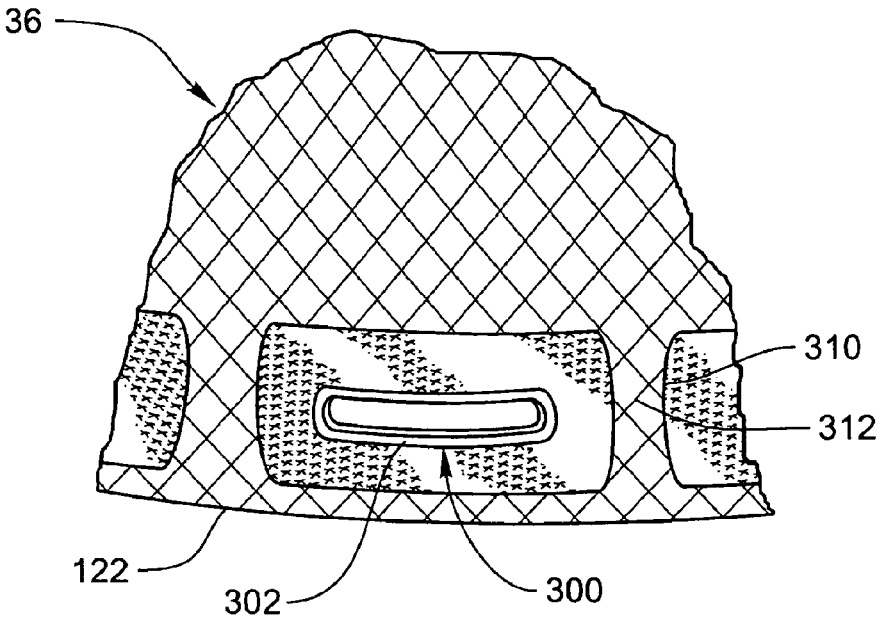
FIG. 5 is a front elevation view of an alternative buttonhole according to the invention.

FIG. 5 is a front elevation view of an alternative buttonhole 300 according to the present embodiments. The buttonhole 300 may be reinforced by a metal or plastic eyelet 302 that is attached to the flexible wall 36 by crimping similar to a rivet or may be sewn to the flexible wall 106.

The buttonhole 300 may be disposed proximate the bottom 122 of the flexible wall 106 in a reinforcement strip 310. As shown, the reinforcement strip 310 may be made from a different material than and made separately from the flexible wall 36. The reinforcement strip 310 may be attached by sewing and/or threaded through holes 312 in the flexible wall 36.

Figure 6:
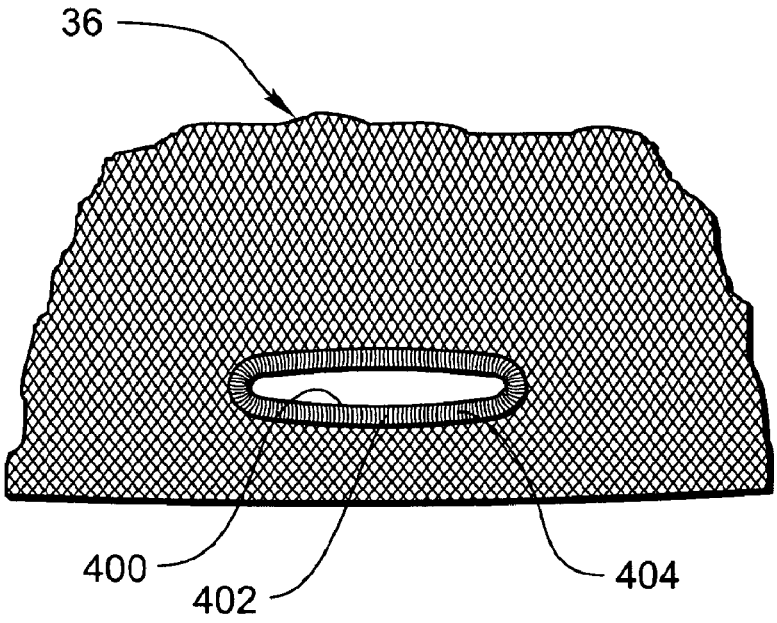
FIG. 6 is a front elevation view of a different buttonhole according to the invention.

FIG. 6 is a front elevation view of a different buttonhole 400 according to the present embodiments. The buttonhole 400 is formed directly in the flexible wall 36 and is reinforced by sewn edges 402. The sewn edges 402 may be formed by a buttonhole stitch 404.

Figure 7:
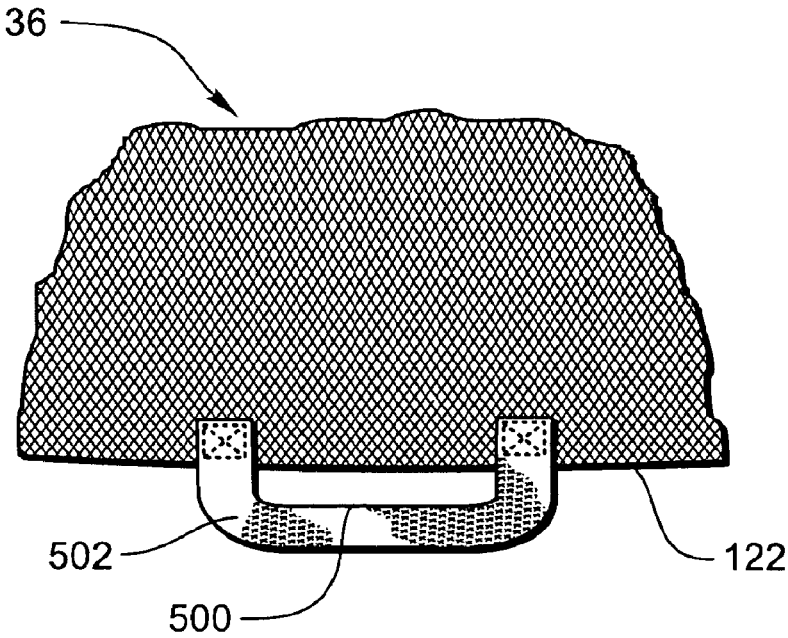
FIG. 7 is a front elevation view of a tab forming a buttonhole according to the invention.

FIG. 7 is a front elevation view of a buttonhole 500 formed by a tab 502 according to the invention. The tab 502 may be attached near the bottom 122 of the flexible wall 36.

It will be appreciated that other means and/or mechanisms for forming a buttonhole structure may be used in accordance with the present invention.

In summary, a trampoline enclosure is provided that may be rapidly and securely attached to the rebounding surface of a trampoline to better protect a jumper from impacting the springs of the trampoline or slipping an arm or leg between the rebounding surface of the trampoline and the flexible wall of the trampoline enclosure.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A trampoline comprising:

a frame;

a rebounding surface comprising a plurality of spring attachment features that attach the rebounding surface to the frame via a plurality of springs;

a plurality of vertical support rods connected to the frame; and a trampoline enclosure comprising:

a flexible wall that connects to the plurality of vertical support rods, said flexible wall being sized to encircle a perimeter of the rebounding surface and having a bottom edge that connects to the rebounding surface; and a plurality of buttonholes that are sized and configured to fit over the spring attachment features and are positioned proximate the bottom edge of the flexible wall and aligned with the spring attachment features to allow the spring attachment features of the rebounding surface to pass through the plurality of buttonholes, and thereby connect the rebounding surface to the bottom edge of the flexible wall.

2. The trampoline of claim 1, wherein the flexible wall comprises a reinforcement strip.

3. The trampoline of claim 1, wherein one or more buttonholes comprises a reinforcement to prevent the buttonholes from tearing.

4. The trampoline of claim 1, wherein one or more of the buttonholes comprises a sewn edge.

5. The trampoline of claim 4, wherein one or more of the buttonholes comprises a buttonhole stitch.

6. The trampoline of claim 1, wherein one or more of the buttonholes comprises a solid plastic disposed about edges of the buttonhole.

7. The trampoline of claim 1, wherein one or more of the buttonholes comprises a tab secured to the flexible wall.

8. A method of attaching a trampoline enclosure to a trampoline comprising:

obtaining a trampoline comprising:

a frame;

a rebounding surface comprising a plurality of spring attachment features that attach the rebounding surface to the frame via a plurality of springs; and a plurality of vertical support rods;

obtaining a trampoline enclosure comprising:

a flexible wall that connects to the plurality of vertical support rods, said flexible wall being sized to encircle a perimeter of the rebounding surface and having a bottom edge that connects to the rebounding surface; and a plurality of buttonholes that are sized and configured to fit over the spring attachment features and are positioned proximate the bottom edge of the flexible wall and aligned with the spring attachment features;

connecting the vertical support rods to the trampoline frame;

connecting the vertical flexible wall to the support rods; and threading the spring attachment features of the rebounding surface through the buttonholes to connect the rebounding surface to the bottom edge of the flexible wall.

9. A method as in claim 8 further comprising the step of disposing the springs between the spring attachment features and the frame.

10. A method as in claim 8 wherein one spring attachment feature is threaded through each buttonhole and one spring connects each spring attachment feature to the frame.

*11. A trampoline comprising:*

*a frame;*

*a rebounding surface comprising a plurality of spring attachment features that attach the rebounding surface to the frame via a plurality of springs;*

*a plurality of vertical support rods connected to the frame; and*

*a trampoline enclosure comprising:*

*a flexible wall that connects to the plurality of vertical support rods, said flexible wall being sized to encircle a perimeter of the rebounding surface and having a bottom edge; and*

*a plurality of buttonholes positioned as a portion of the flexible wall proximate the bottom edge of the flexible wall and disposed between the rebounding surface and the frame.*

*12. The trampoline as in claim 11, wherein the number of buttonholes is equal to the number of spring attachment features.*

*13. The trampoline as in claim 11, wherein the buttonholes are disposed between the rebounding surface and the plurality of springs.*

*14. The trampoline as in claim 13, wherein coupling of the plurality of springs to the spring attachment features secures the bottom edge between the rebounding surface and the plurality of springs.*

*15. The trampoline as in claim 11, wherein the buttonholes are shaped to be positioned over the plurality of spring attachment features.*

*16. The trampoline as in claim 11, wherein the flexible wall comprises a reinforcement strip.*

*17. The trampoline as in claim 11, wherein one or more buttonholes comprises a reinforcement to prevent the buttonholes from tearing.*

*18. A method of attaching a trampoline enclosure to a trampoline comprising:*

*obtaining a trampoline comprising:*

*a frame:*

*a rebounding surface comprising a plurality of spring attachment features that attach the rebounding surface to the frame via a plurality of springs; and*

*a plurality of vertical support rods;*

*obtaining a trampoline enclosure comprising:*

*a flexible wall that connects to the plurality of vertical support rods, said flexible wall being sized to encircle a perimeter of the rebounding surface and having a bottom edge; and*

*a plurality of buttonholes positioned as a portion of the flexible wall proximate the bottom edge of the flexible wall and disposed between the rebounding surface and the frame;*

*connecting the vertical flexible wall to the support rods;*

*positioning the buttonholes over the spring attachment features; and*

*attaching the springs to the spring attachment features.*

*19. A method as in claim 18 wherein one buttonhole is positioned over one spring attachment feature and one spring connects each spring attachment feature to the frame.*

*20. A process of making a trampoline enclosure for use with a trampoline comprising a frame, a rebounding surface comprising a plurality of spring attachment features that attach the rebounding surface to the frame via a plurality of springs, the method comprising:*

*obtaining a flexible wall of material being sized to encircle a perimeter of the trampoline rebounding surface, wherein the flexible wall has a top edge and a bottom edge;*

*providing a reinforcement strip at the bottom edge; and*

*incorporating a plurality of buttonholes positioned proximate the bottom edge, wherein the quantity and spacing of the buttonholes around the bottom edge are selected to correspond to a quantity and spacing of the springs used to attach the rebounding surface to the frame.*

* * * * *